(No Model.)

E. W. EATON.
ATTACHMENTS FOR TYPE WRITING MACHINES.

No. 509,121. Patented Nov. 21, 1893.

Witnesses
Annie H. Martin
Annie D. Graham

Inventor
Ethan W. Eaton
by J. W. Garner
Attorney

UNITED STATES PATENT OFFICE.

ETHAN W. EATON, OF SOCORRO, TERRITORY OF NEW MEXICO.

ATTACHMENT FOR TYPE-WRITING MACHINES.

SPECIFICATION forming part of Letters Patent No. 509,121, dated November 21, 1893.

Application filed April 5, 1893. Serial No. 469,146. (No model.)

*To all whom it may concern:*

Be it known that I, ETHAN W. EATON, of Socorro, county of Socorro, and Territory of New Mexico, have invented a new and useful Improvement in Attachments for Type-Writing Machines; and I do hereby declare that the following is a full, clear, and exact description of the invention, which will enable others skilled in the art to which it appertains to make and use it, reference being had to the accompanying drawings, forming a part thereof.

My invention relates to an improvement in a spacing attachment for type writing machines, trically with the cylinder and at opposite or free end of the spacing attachment is an arm or handle K, adapted to be pressed by the thumb of the operator.

Figure 1:
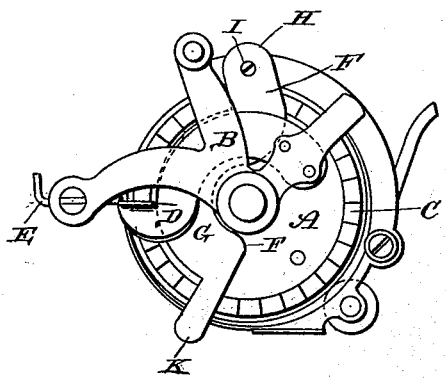
Figure 2:
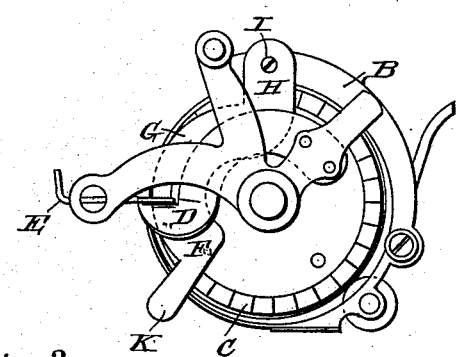
Figure 3:
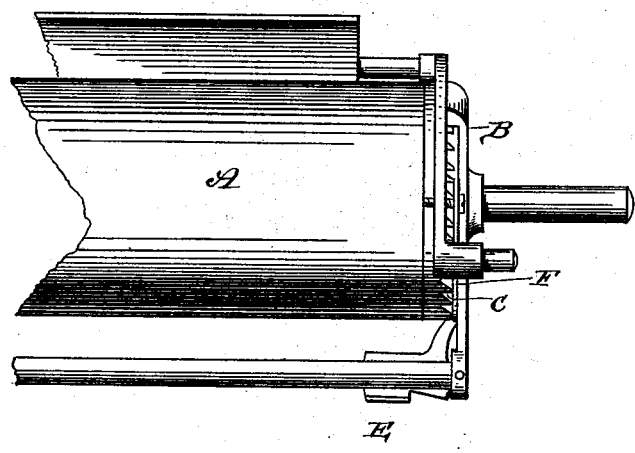

The body of my improved spacing attachment is arranged on the inner side of the spring space dog D, and between the latter and the end of the cylinder, and when the attachment is arranged concentrically on the end of the cylinder in the position shown in Fig. 1, it is in disuse, has no function, and the spring dog D, is in its normal engagement with one of the space teeth C, of the cylinder. When thus arranged the cylinder may be only ment for type writing machines hereinbefore shown and described, as it is evident that modifications may be made therein without departing from the spirit of my invention; and neither do I desire to limit myself to the use of my improved spacing attachment in connection with the Smith-Premier type writing machines, for the reason that my invention may be readily modified in such manner as to adapt it for use in connection with type writing machines of all the various kinds.

Having thus described my invention, I claim—

1. In combination with the feed cylinder and spacing dog of a type writing machine, the device substantially as hereinbefore described, to disengage the dog and retard the rotation of the cylinder, substantially as described.

2. The combination in a type writing machine of the cylinder having the space teeth and the dog of the pivoted attachment F, to disengage the dog from the space teeth and interpose itself between the said dog and teeth, substantially as described.

In testimony that I claim the foregoing I append my signature.

ETHAN W. EATON.

Witnesses:
J. W. GARNER,
ANNIE H. MARTIN.